June 20, 1961

R. F. McAFEE 2,989,206

OUTLET BOX EXTENSION

Filed June 1, 1960

INVENTOR.
ROBERT F. McAFEE
BY
McMorrow, Berman & Davidson
ATTORNEYS

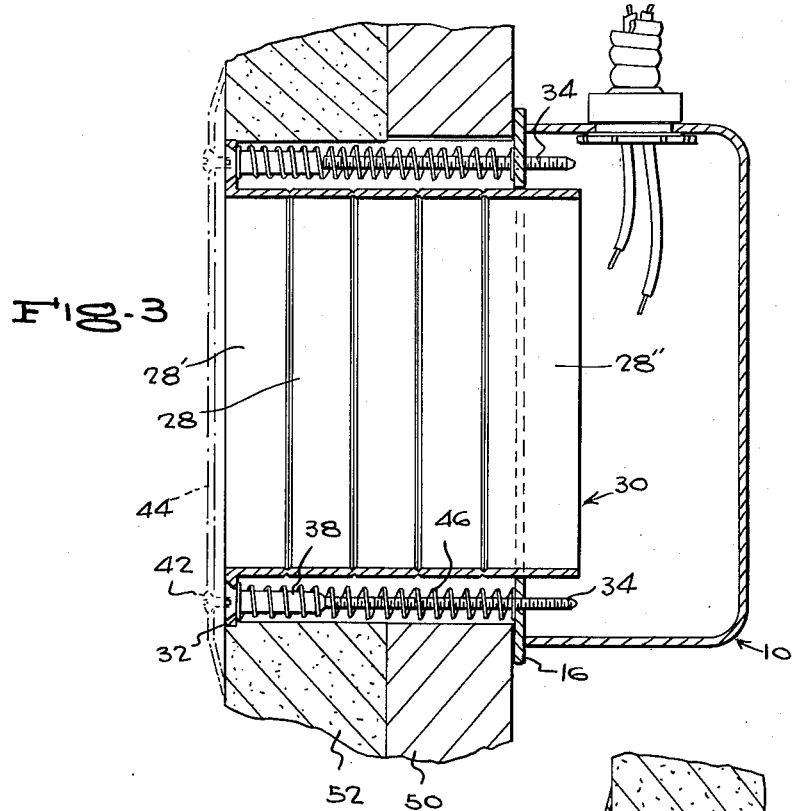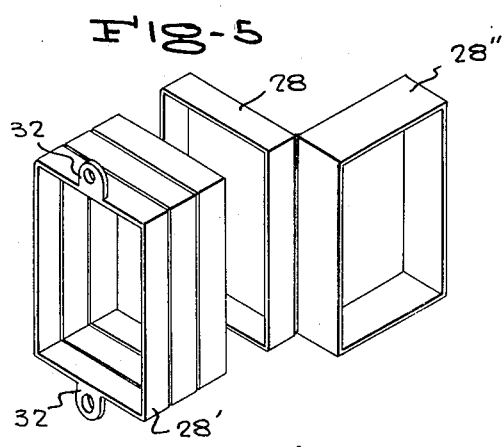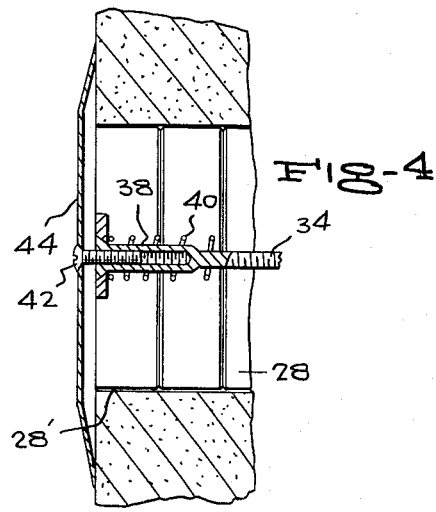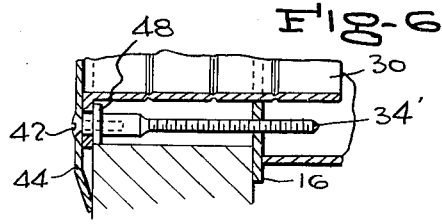

United States Patent Office 2,989,206
Patented June 20, 1961

2,989,206
OUTLET BOX EXTENSION
Robert F. McAfee, 701 Pulaski, Lincoln, Ill.
Filed June 1, 1960, Ser. No. 33,236
5 Claims. (Cl. 220—3.7)

The present invention relates to electrical wiring systems generally and in particular to an extension for an outlet box.

In the building industry, it has long been the practice to install the electrical system prior to finishing the walls. The electrical system includes outlet boxes which are commonly supported on studs with their open faces facing outwardly. When the wall is completed, the studs are covered with wallboard, or lath and plaster. It is not always possible to position the outlet box so that its face is contiguous to the finished wall surface. Various expedients have been proposed and are in use. Extension means in the form of plaster rings have been proposed and an electrician commonly has one or more plaster rings to serve as extensions for the walls of the outlet box. The electrician must have on hand plaster rings ranging in length from half-inch to two inches.

An object of the present invention is to provide an outlet box extension which may be mounted as a cover on a junction box, the junction box affording more working room for the electrician and the extension having breakaway sections which enable the electrician to mount the electrical fixture contiguous to the lower surface with ease and facility.

Another object of the present invention is to provide an outlet box extension which is adjustable so that the electrician can mount the electrical fixture and face plate at the proper position with respect to the finished wall surface irrespective of the thickness of the wall.

A further object of the present invention is to provide an outlet box extension which is simple in structure, one sturdy in construction, one which may be manufactured in quantity at reasonable cost, and one which is highly effective in action.

These and other objects and advantages of the present invention will be fully apparent from the following description when taken in conjunction with the annexed drawings, in which:

FIGURE 3 is a sectional view as seen from the side of the assembly shown in FIGURE 2, and on an enlarged scale;

FIGURE 4 is a fragmentary sectional view showing the means for attaching the face plate to the outlet box extension of the present invention;

FIGURE 5 is an exploded isometric view showing how the breakaway sections of the extension are broken away; and FIGURE 6 is a modified form of the face plate securing means.

Figure 1:
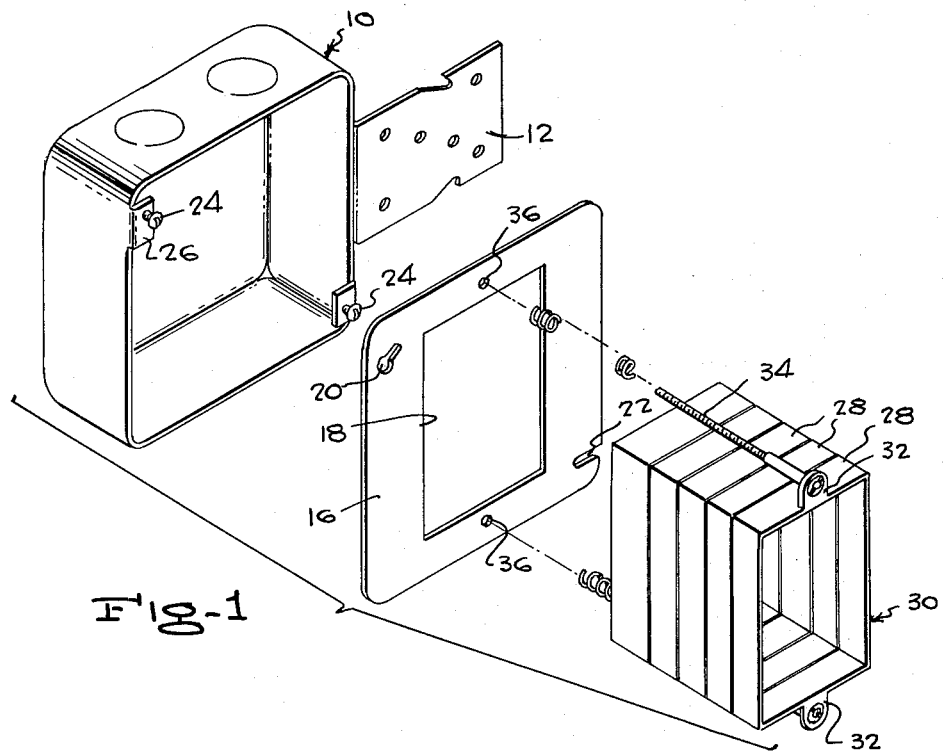
FIGURE 1 is an exploded isometric view of the outlet box extension of the present invention shown in position for attachment to an outlet box.
Figure 2:
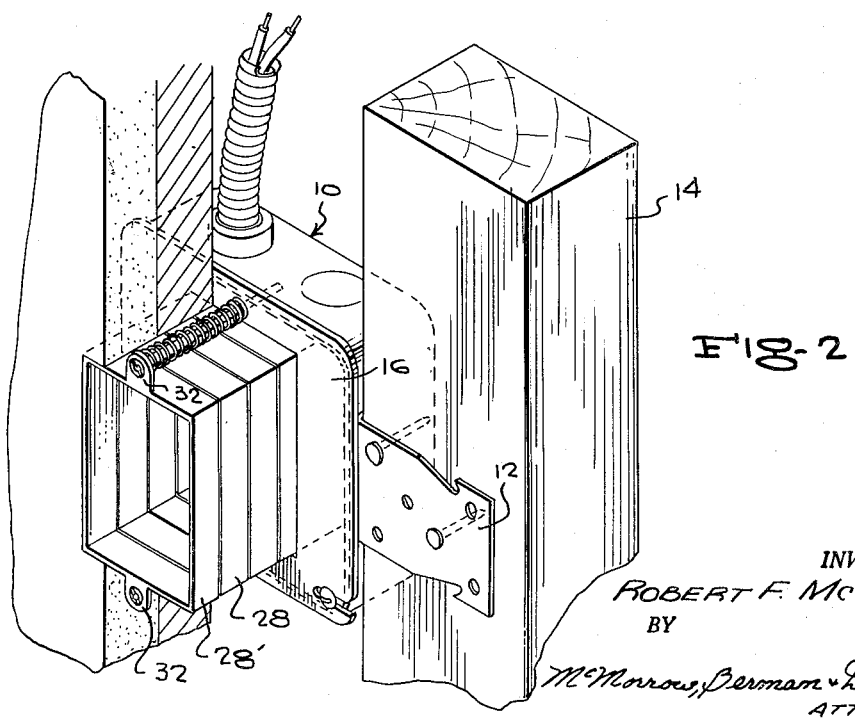
FIGURE 2 is an isometric view of the assembly shown in FIGURE 1, shown installed upon a wall stud.

Referring in detail to the drawings in which like numerals indicate like parts throughout the several views, in FIGURES 1 to 3, the reference numeral 10 designates generally a junction or outlet box of conventional construction and having a bracket 12 projecting from one side for attachment to a stud, as at 14 in FIGURE 2.

The present invention provides a cover 16 extending over and closing the open front of the box 10. The cover 16 is provided with an access opening 18 and with slots 20 and 22 for securing the cover 16 to the box 10. The slots 20 and 22 accommodate screws 24 received in threaded holes provided in tabs 26 which project inwardly from the wall of the box 10, such construction being conventional for which no invention is claimed.

The invention provides an open ended tunnel member 30 composed of a plurality of breakaway sections 28 arranged in end to end relation with the end section 28' provided with lugs 32 which project from the upper and lower ends of the section 28'.

The section of the tunnel member 30 remote from the section 28' is of a greater length than the other sections and is designated generally by the reference numeral 28".

The tunnel member 30 is of a size and shape to snugly slidably telescope into and out of the opening 18 in the cover 16 so that one end portion is housed within the box 10 and the other end portion is exteriorly of the cover 16, as in FIGURE 3.

Fastening means embodying screw elements 34 pass through the lugs 32 and are in engagement with anchoring means embodying threaded holes 36 provided in the cover 18. Each of the screw elements 34 has an enlarged portion 38 adjacent one end provided with a bore 40 extending inwardly from the free ends thereof. Each bore 40 is slanted to receive a common machine screw 42 for securing a face plate 44 to the extension section 28'. This structure is seen most clearly in FIGURE 4.

A coil spring 46 is circumposed about the screw element 34 and biases the tunnel member 30 to the forward position, one end of the spring 46 bearing against the cover 16 and the other end bearing against the inner face of the adjacent lug 32.

In the form of the invention shown in FIGURE 6, the coil spring 46 is omitted and the screw element 34' is provided with a shoulder inwardly of the free end of the enlarged portion. A washer 48 bears against the shoulder and positions the lugs of tunnel member 30 at the required distance from the cover 16 as determined by how far the screw element 34 is screwed into the cover 16.

In use, the outlet box 10 is installed upon the stud 14 prior to finishing of the wall which includes a base 50 and, as shown in FIGURE 3, a plaster coating on the base 50, as at 52.

When the wall is finished, the tunnel member 30 is inserted into the opening 18 in the cover 16, the cover previously having been fastened to the open face of the box 10. One or more sections of the tunnel member 30 may be removed so as to adjust the length of the tunnel member to the depth necessary to accommodate the thickness of the wall.

The screw elements 34 secure the tunnel member to the cover 16 and the screws 42 secure the face plate 44 to the lugs 32 of the tunnel member 30.

An electrical fixture such as an outlet member may be installed within the free end of the tunnel member 30 and supported upon the lugs 32 by the same screws 42 that secure the face plate over the electrical fixture.

What is claimed is:
1. In combination with an outlet box having an open front, a cover extending over and closing the open front of said box, said cover being provided with an access opening, an open ended tunnel member of a size and shape to snugly slidably telescope into the opening in said cover so that one end portion is housed within said box with the other end portion exteriorly of said cover supported upon said cover, opposed lugs on said other end of said tunel member, and fastening means passing through said lugs and in engagement with anchoring means provided in said cover.

2. In combination with an outlet box having an open front, a cover extending over and closing the open front of said box, said cover being provided with an access opening, an open ended tunnel member of a size and shape to snugly slidably telescope into the opening in said cover so that one end portion is housed within said box with the other end portion exteriorly of said cover supported upon said cover, opposed lugs on said other end of said tunnel member, and fastening means embodying screw elements pasing through said lugs and in engagement with anchoring means embodying threaded holes provided in said cover.

3. In combination with an outlet box having an open front, a cover extending over and closing the open front of said box, said cover being provided with an access opening, an open ended tunnel member composed of a plurality of breakaway sections arranged in end to end relation and being of a size and shape to snugly slidably telescope into the opening in said cover so that one end portion is housed within said box with the other end portion exteriorly of said cover supported upon said cover, opposed lugs on said other end of said tunnel member, and fastening means passing through said lugs and in engagement with anchoring means provided in said cover.

4. In combination with an outlet box having an open front, a cover extending over and closing the open front of said box, said cover being provided with an access opening, an open ended tunnel member composed of a plurality of breakaway sections arranged in end to end relation and being of a size and shape to snugly slidably telescope into the opening in said cover so that one end portion is housed within said box with the other end portion exteriorly of said cover supported upon said cover, opposed lugs on said other end of said tunnel member, and fastening means embodying screw elements passing through said lugs and in engagement with anchoring means embodying threaded holes in said cover.

5. In combination with an outlet box having an open front, a cover extending over and closing the open front of said box, said cover being provided with an access opening, an open ended tunnel member composed of a plurality of breakaway sections arranged in end to end relation and being of a size and shape to snugly slidably telescope into the opening in said cover so that one end portion is housed within said box with the other end portion exteriorly of said cover supported upon said cover, opposed lugs on said other end of said tunnel member, and fastening means embodying screw elements passing through said lugs and in engagement with anchoring means embodying threaded holes in said cover, each of said screw elements being adapted to support an electrical fixture thereon.

References Cited in the file of this patent

UNITED STATES PATENTS

| | | |
|---|---|---|
| 788,880 | Bossert | May 2, 1905 |
| 882,337 | McMurtrie | Mar. 17, 1908 |
| 2,378,861 | Peevey | June 19, 1945 |